US012596589B2

(12) United States Patent
Lockman, III et al.

(10) Patent No.: US 12,596,589 B2
(45) Date of Patent: Apr. 7, 2026

(54) SYSTEM AND METHOD FOR WORKLOAD MANAGEMENT BETWEEN HARDWARE COMPONENTS

(71) Applicant: Dell Products L.P., Round Rock, TX (US)

(72) Inventors: John A. Lockman, III, Granite Shoals, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 18/307,443

(22) Filed: Apr. 26, 2023

(65) Prior Publication Data

US 2024/0362077 A1    Oct. 31, 2024

(51) Int. Cl.
*G06F 9/50*        (2006.01)

(52) U.S. Cl.
CPC ............ *G06F 9/5072* (2013.01); *G06F 9/505* (2013.01); *G06F 9/5077* (2013.01)

(58) Field of Classification Search
CPC .................................................... G06F 9/5072
USPC ......................................................... 718/105
See application file for complete search history.

(56) References Cited

U.S. PATENT DOCUMENTS

| | | | |
|---|---|---|---|
| 11,138,048 B2 | 10/2021 | Barik et al. | |
| 2013/0031554 A1* | 1/2013 | Hou ...................... | G06F 9/4843 718/100 |
| 2022/0198117 A1* | 6/2022 | Raumann .............. | G06F 9/5011 |

OTHER PUBLICATIONS

Torng, Christopher, Moyang Wang, and Christopher Batten. "Asymmetry-aware work-stealing runtimes." ACM SIGARCH Computer Architecture News 44.3 (2016): 40-52. (Year: 2016).*
"PERF05-BP01 Understand how networkingimpacts performance," Amazon Web Services, Web Page <https://docs.aws.amazon.com/wellarchitected/latest/performance-efficiency-pillar/perf_select_network_understand_impact.html> accessed on Jan. 8, 2023 (4 Pages).
"Configure Azure CNI networking in Azure Kubernetes Service (AKS)," Microsoft, Web Page <https://learn.microsoft.com/en-us/azure/aks/configure-azure-cni> accessed on Jan. 8, 2023 (17 Pages).
Hawthorne, Mel, "What Is Work Stealing?" TechniPages, Web Page <https://www.technipages.com/what-is-work-stealing/> accessed on Jan. 8, 2023 (7 Pages).
Gad, Esraa A., "A Work-Stealing For Dynamic Workload Balancing On CPU-GPU Heterogeneous Computing Platforms" (2017) Electronic Theses and Dissertations. 945. (43 Pages).

* cited by examiner

*Primary Examiner* — Charlie Sun
(74) *Attorney, Agent, or Firm* — WOMBLE BOND DICKINSON (US) LLP

(57)        ABSTRACT

Methods and systems for performing workloads are disclosed. To perform the workloads, operations may be performed by compute complexes. The compute complexes may perform some types of operations inefficiently. To accelerate completion of the workloads, operations to be performed by the compute complexes may be analyzed by other hardware components in a manner that is transparent to the compute complexes. Operations that may be performed more quickly by the other hardware components may be automatically and transparently offloaded.

20 Claims, 7 Drawing Sheets

SYSTEM AND METHOD FOR WORKLOAD MANAGEMENT BETWEEN HARDWARE COMPONENTS

FIELD OF THE DISCLOSED EMBODIMENTS

Embodiments disclosed herein relate generally to workloads. More particularly, embodiments disclosed herein relate to systems and methods for managing workloads performed by distributed systems.

BACKGROUND

Computing devices may provide various computer implemented services by performing corresponding workloads. The computer implemented services may be desired by end users and/or other systems. Different computing devices may perform similar and/or different portions of workloads. The components of the computing devices may have limits on the rate at which workloads may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
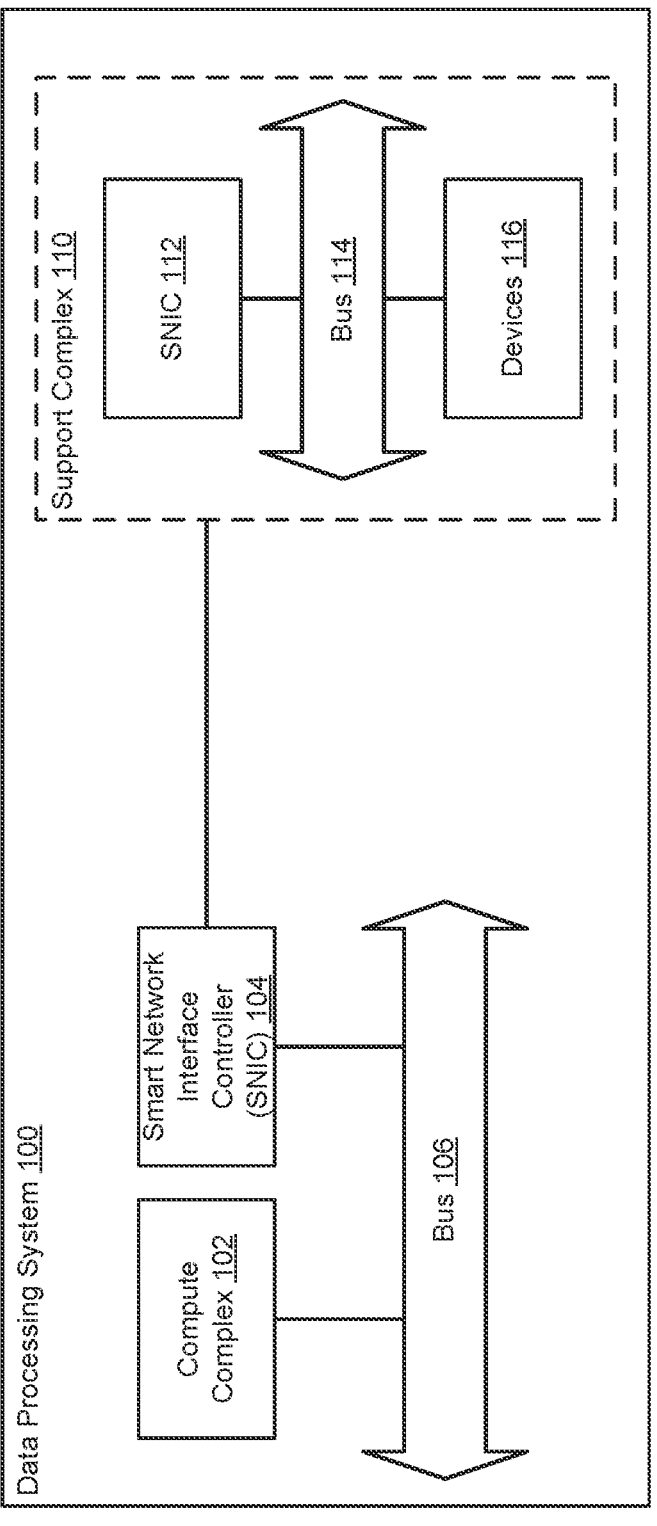
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing workload performance. To manage workload performance, various operations may be automatically and transparently (from the perspective of compute complexes) offloaded from compute complexes to acceleration hardware.

The operations may be offloaded by direct snooping (e.g., reading memory of the compute complexes) and/or communication interrogation (e.g., by identify operations that a compute complex has instructed other devices to perform). When identified, the operations may be analyzed to identify whether the operations may be completed more quickly using acceleration hardware rather than the device assigned to process the operations.

If likely to be completed more quickly, the operations may be performed by the acceleration hardware. Results from the performance of the operation may be provided to the compute complex in a transparent manner (e.g., either through direct memory writes to locations in memory where such results would naturally reside or through integration with communications from other devices, which may be processed by processors of compute complexes).

By doing so, a data processing system in accordance with embodiments disclosed herein may more efficiently perform workloads by accelerating completion of operations that may otherwise be costly to perform using general purpose compute hardware. By offloading the operations to acceleration hardware, these operations may be performed in a more efficient manner thereby allowing the workloads to be accelerated. Thus, embodiments disclosed herein may, among others, address the technical problem of limited computing resources for performance of workloads. By reducing inefficient use of general purpose compute hardware, workloads may be completed more quickly.

In an embodiment, a method for managing performance of workloads across a heterogenous processing system is disclosed. The heterogenous processing system may include compute complexes, support complexes, and communication devices/processing units which may automatically and transparently identify and perform operations to acceleration completion of workloads. The method may include identifying operations queued by a compute complex to be performed to complete a workload; identifying an operation of the operations estimated to be completed more quickly by a data processing unit than an entity assigned to perform the operation; prior to initiation of performance of the operation by the entity: removing the operation from a queue; initiating performance of the operation by a second entity to obtain a result; and populating the compute complex with the result.

Identifying the operation may include compiling at least a portion of a first test operation of the operations for acceleration hardware of the second entity to obtain a compiled test operation; initiating execution of the compiled test operation for the acceleration hardware to identify an execution rate; making a determination regarding whether the execution rate exceeds a threshold; in a first instance of the determination where the execution rate exceeds the threshold: selecting the test operation as the operation; and in a second instance of the determination where the execution rate does not exceed the threshold: discarding the first test operation as a candidate for being the operation.

The data processing unit may include the acceleration hardware.

The data processing unit may present itself to the compute complex as a bare metal resource.

The compute complex may host the queue, and the second entity may be the data processing unit.

Populating the compute complex with the result may include storing the result in a memory location where the compute complex would store a result of performing the operation by the compute complex or another device.

The other device may be a graphics processing unit, and the queue may be part of (e.g., stored in) memory of the device populated by the compute complex using remote direct memory access. Remote direct memory access may allow devices other than processors to directly store data in system memory.

In an embodiment, a non-transitory computer readable media is provided. The non-transitory computer readable medium may include instructions that when executed by a processor cause the method to be performed.

In an embodiment, a data processing system is provided. The data processing system may include the non-transitory computer readable media and a processor, and may initiate performance of the method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include any number of data processing system 100.

Data processing system 100 may provide computer implemented services to users and/or other computing devices operably connected to data processing system 100 by performing various workloads. The computer implemented services may include any type and quantity of services including, for example, database services, instant messaging services, video conferencing services, etc. Different data processing systems may provide similar and/or different computer implemented services.

To provide the computer implemented services, data processing system 100 may include various hardware resources such as compute complex 102, smart network interface controller (SNIC) 104, bus 106, and/or support complex 110. Each of these hardware resources is discussed below.

Compute complex 102 may include hardware devices such as processors, memory modules, etc. These hardware devices may support execution of computer code that causes the computer implemented services to be provided. While providing the computer implemented services, data may be stored in memory (e.g., provided by the memory modules) and/or storage (e.g., non-transitory storage). Compute complex 102 may store data in storage device (e.g., may be one of device 116, may be network attached storage not shown in FIG. 1, etc.).

SNIC 104 may facilitate communication between compute complex 102 and other devices For example, SNIC 104 may facilitate communication with support complex 110 and/or other support complex reachable via communication systems (e.g., 120). In doing so, SNIC 104 may implement various communication protocols, may selectively allocate its communication resources, etc. Through these communications, compute complex 102 may utilize computing resources provided by devices 116 to perform various workloads.

Bus 106 may operably connect compute complex 102, or portions thereof, with SNIC 104. Thus, compute complex 102 may communicate with other entities via bus 106.

When providing the computer implemented services, workloads performed by compute complex 102 and/or device 116 may utilize limited computing resources (e.g., processing resources, memory resources). Thus, compute complex 102 may only be able to individually perform a certain quantity of workloads.

Further, any of the workloads performed may require certain forms of processing which compute complex 102 and/or devices 116 may not be optimized to perform. For example, various types of cryptographic, graphic, artificial intelligence, and/or other types operations may be performed by compute complex 102 but may be more efficiently performed using acceleration hardware not available to compute complex 102.

In general, embodiments disclosed herein relate to systems, methods, and devices for managing performance of workloads through automatic identification and acceleration of portions of the workloads. The workloads may be accelerated by offloading certain operations or groups of operations to specialized hardware hosted by SNICs (e.g., 104, 112). The results of the operations may be returned to the entities performing the workloads in a manner that is unlikely to interrupt performance of the workloads and without adding additional management overhead to the entities (e.g., compute complex 102, devices 116) performing the workloads.

To identify the presence of the operations that may be accelerated, the SNICs may snoop workloads being performed by other components. For example, the SNICs may (i) monitor memory used to cache operations which are queued for execution by processors of compute complex 102 and/or hardware of devices 116, (ii) monitor communications between compute complex 102 and devices 116, and/or via identify the operations via other methods.

Once identified, the SNICs may verify that local acceleration hardware of the SNICs is likely to be able to complete performance of the operations more quickly than the hardware components which will otherwise perform the operations. If the acceleration hardware is likely to complete performance of the operations more quickly, then the SNICs may perform the operations to obtain results, and populate the results in the hardware such that, from the perspective of the hardware, the operations were completed in a manner that they would otherwise be completed by the other hardware.

To Provide the Above Noted Functionality, data processing system 100 may include compute complex 102, SNICs (e.g., 104, 112), and any number of support complexes (e.g., 110).

Compute complex 102 may, as noted above, include processors and memory. The processors may perform various operations as part of performance of workloads. The operations may, depending on the architecture of the processors, be stored in memory to be queued for processing. When the operations are processed, the processor may generate results which may be stored in memory.

Additionally, for some operations, the processors may instruct any of devices 116 to perform the operations. Once performed, the results of the operations may be send back to compute complex 102 and stored in memory.

These hardware components of compute complex 102 may be operably connected to SNIC 104 via bus 106.

Figure 2A:
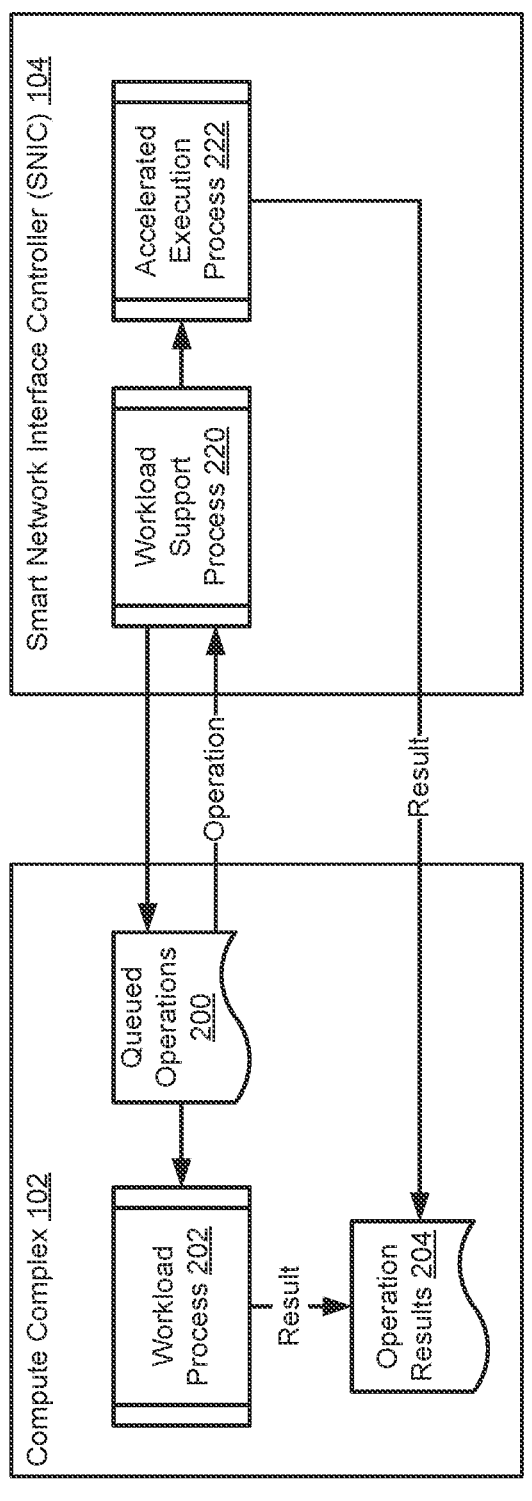
FIGS. 2A-2C show data flow diagrams in accordance with an embodiment.
Figure 2B:
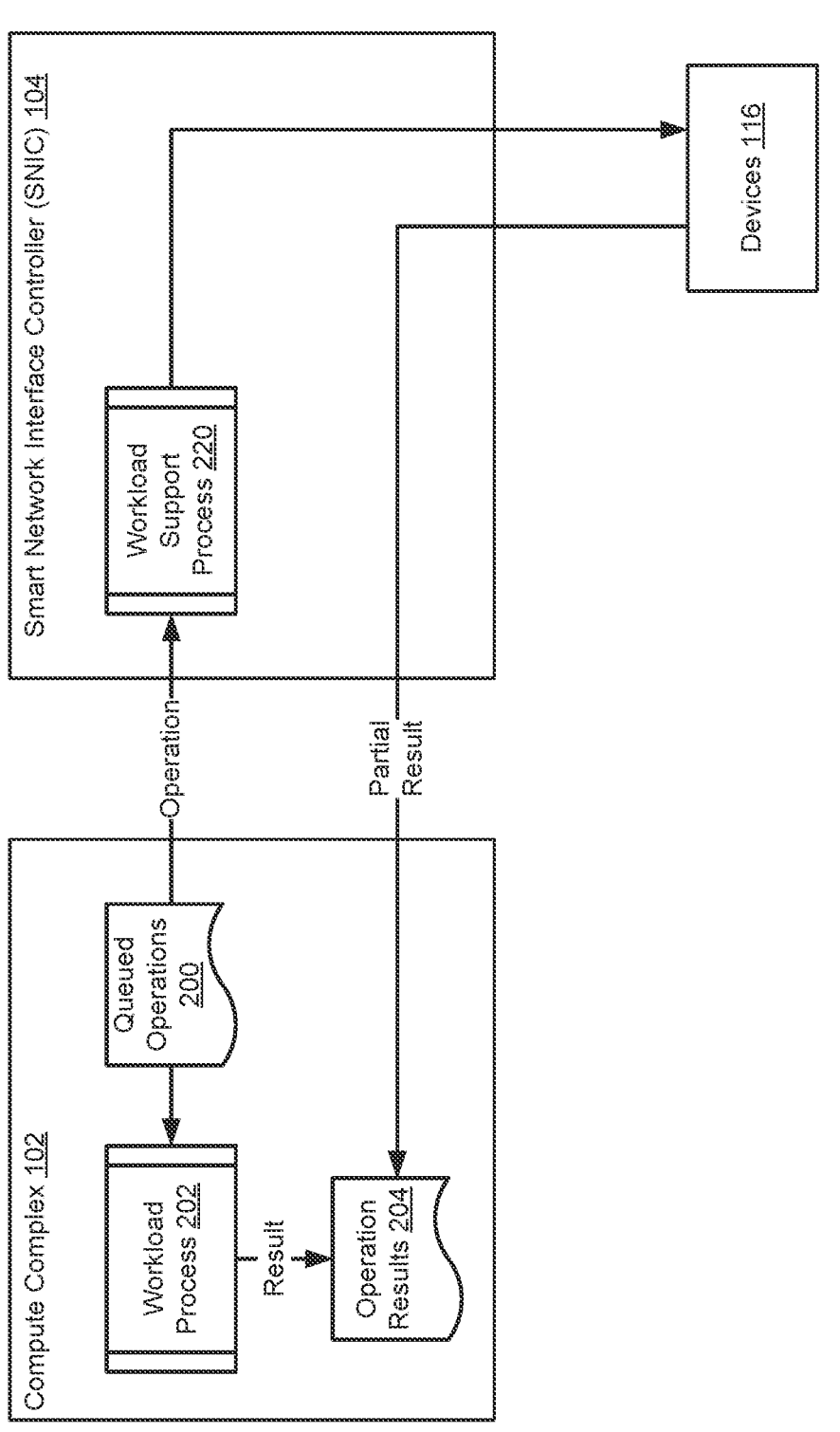
Figure 2C:
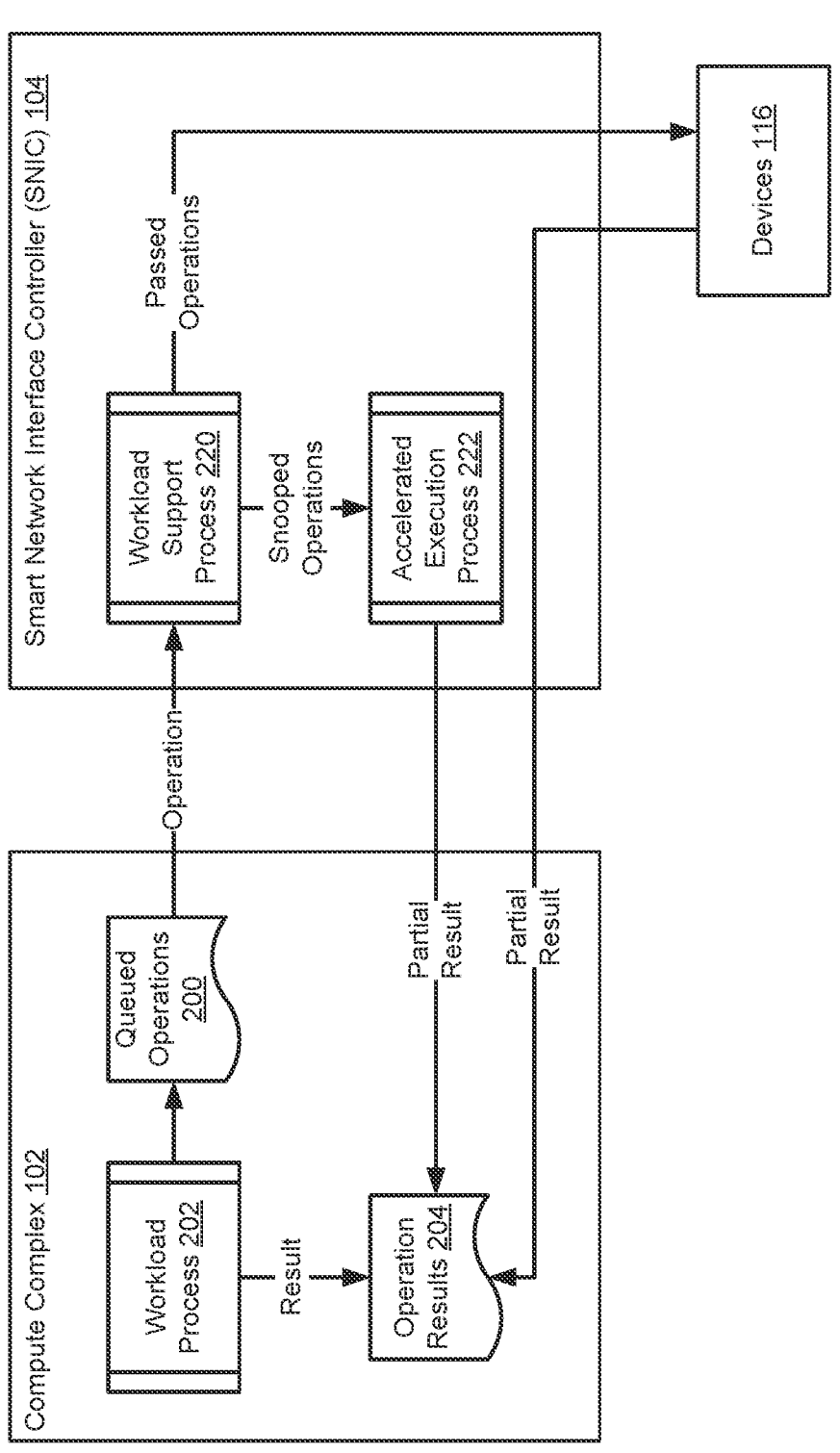

SNIC 104 may provide communication services for compute complex 102 and acceleration performance of operations for compute complex 102. For example, SNIC 104 may (i) monitor operations queued for performance by processors of compute complex 102 or devices 116, (ii) for operations that may be accelerated, retrieve the operations (e.g., by removing them from memory of compute complex or intercepting them from communications directed to devices 116), (iii) perform the retrieve operations to generate results, and/or (iv) store the results in corresponding locations for the operations with compute complex 102. Refer to FIGS. 2A-2C for additional details regarding accelerating performance of operations for compute complex 102.

SNIC 104 may be implemented with a data processing unit and/or other types of communications device which may include processing resources, acceleration hardware, and/or other hardware components usable to perform portions of workloads. SNIC 112 may be similar to SNIC 104.

Support complex 110 may participate in performance of workloads by performing various operations for compute complex 102 and returning results of the operations to compute complex 102.

To participate in performance of workloads, support complex 110 may include devices 116. Devices 116 may include any number of hardware devices such as general purpose processors and special purpose processor (e.g., graphics processing units, application specific integrated circuits, etc.). Devices 116 may perform processing as part of workloads managed by compute complex 102. Devices 116 may perform processing that is similar to or different from the processing performed by compute complex 102.

When contributing to workloads in cooperation with compute complexes, the SNICs 104, 112 may present some of devices 116 as bare metal resources to the processors of compute complex 102. For example, the SNICs may implement abstraction layers that present any of devices 116 (and/or virtualized devices using devices 116) to compute complex 102 as a bare metal device via communications over bus 106, even while devices 116 are not directly connected to compute complex 102 via bus 106. Through bus 106, SNIC 104 may directly communication with processors, memory modules, and/or other hardware components via bare metal communications.

Bus 114 may operably connect SNIC 112 and devices 116. Busses 106, 114 may be implemented with communications links that may comply with any communication standard. For example, busses 106, 114 may be implemented with one or more communication links that may conform to a communication specification such as the Peripheral Component Interconnect Express (PCIe) specification, or other types of communication standard.

SNICs 104, 112 may be implemented with a hardware devices and/or software components hosted by the hardware devices. In an embodiment, SNICs 104, 112 are implemented using a hardware device including circuitry. The hardware device may be, for example, a digital signal processor, a field programmable gate array, system on a chip, or an application specific integrated circuit. The circuitry may be adapted to cause the hardware device to perform the functionality of SNICs 104, 112. SNICs 104, 112 may be implemented using other types of hardware devices without departing from embodiments disclosed herein.

In an embodiment, SNICs 104, 112 are implemented using a processor adapted to execute computing code stored on a persistent storage that when executed by the processor performs the functionality of any of SNICs 104, 112 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing from embodiments disclosed herein.

SNICs 104, 112 may be implemented with and/or perform the functions of various types of devices such as data processing units (e.g., portions of a chip or a system on a chip), infrastructure processing units, smart network interface controllers, etc. These devices may generally be programmable, facilitate communications with other components, include accelerator cores or other components for speeding the performance of certain functions such as cryptography, and/or may generally include configurable units to perform a broad array of functions through configuration.

Data processing system 100 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components without departing from embodiments disclosed herein.

To further clarify embodiments disclosed here, data flow diagrams illustrating data structures used by an processes performed by the system of FIG. 1 in accordance with an embodiments are shown in FIG. 2A-2C. In these figures, a first set of shapes (e.g., 200, 204) is used to show data structures, a second set of shapes (e.g., 202, 220, 222) is used to show processes that may be performed, and a third set of shapes (e.g., 102, 104 116) is used to show components that may use the data structures and perform the processes.

Turning to FIG. 2A, a first data flow diagram in accordance with an embodiment is shown. To perform workloads, compute complex 102 may perform workload process 202. During workload process, workload may be converted (e.g., by a management entity such as an operating system) into groups of operations that may be separately performed to obtain results. The groups of operations may be populated into memory as queued operations 200 for subsequent execution by a processor to obtain operation results 204. While in memory, queued operation 200 may be monitored and analyzed by SNIC 104 during workload support process 220.

During workload support process 220, SNIC 104 may monitor the memory locations where queued operations 200 may be stored. Queued operations 200 may be analyzed to identify whether any of the operations may be performed more quickly by SNIC 104. If any are identified, the operations may be retrieved from the memory and executed via accelerated execution process 222.

During accelerated execution process 222, the operations may be performed using, for example, acceleration hardware of SNIC 104. To do so, the operations may be compiled for the acceleration hardware, and performed thereby generating any number of results.

The results may be populated in memory of compute complex 102 in a location where traditional processing of the operation via a process or compute complex 102 would store them. Consequently, the results obtained by SNIC 104 may be SNIC 104 may be added to operation result 204, thereby accelerating the rate at which queued operations 200 are performed without adding additional overhead for compute complex 102.

For example, compute complex 102 may not need to modify the way in which it schedules performance of queued operations 200, may not need to actively send operations to SNIC 104 for performance, etc. Rather, SNIC 104 may actively snoop queued operations 200 to proactively identify, retrieve, and perform various operations which may be performed more quickly than via processing by processors of compute complex 102.

However, in addition to processing queued operation 200 using processors, compute complex 102 may also actively schedule operations to be performed by other devices. For example, if a processor has access to a graphics processing unit, the processor may offload certain types of operations for processing by the graphics processing unit.

Turning to FIG. 2B, a second data flow diagram in accordance with an embodiment is shown.

Continuing with the discussion from FIG. 2A, compute complex 102 may send some of queued operations to devices 116 for processing. The operations may be encapsulated and/or otherwise sent to devices 116 via SNIC 104. When received by SNIC 104, the operations may be reviewed as part of workload support process 220 to identify whether any of the operations may be offloaded to SNIC 104 for execution.

If any are identified, the operations may be processed by SNIC 104, as will be discussed in more detail with respect to FIG. 2C.

The remaining operations may be passed to devices 116 for processing. The processing may result in partial results being returned to compute complex 102 and stored in memory as part of operation results 204.

Turning to FIG. 2C, a third data flow diagram in accordance with an embodiment is shown.

Continuing with the discussion from FIG. 2B, any operations that are identified by SNIC 104 for processing (e.g., snooped operations) may be processed as part of accelerated execution process 222. To process the operations, the operations may be compiled to a form which may be ingested by hardware acceleration of SNIC 104, and run using the hardware acceleration.

The results of accelerated execution process 222 may also be provided to compute complex 102 as a partial result of the operations originally directed to devices 116. Consequently, partial results from both SNIC 104 and devices 116 for the operations may be provided to compute complex 102 and stored as part of operation results 204.

In this manner, operations may be both actively retrieved and accelerated, as described with respect to FIG. 2A, as well as passively identified and accelerated as described with respect to FIGS. 2B-2C.

Figure 3A:
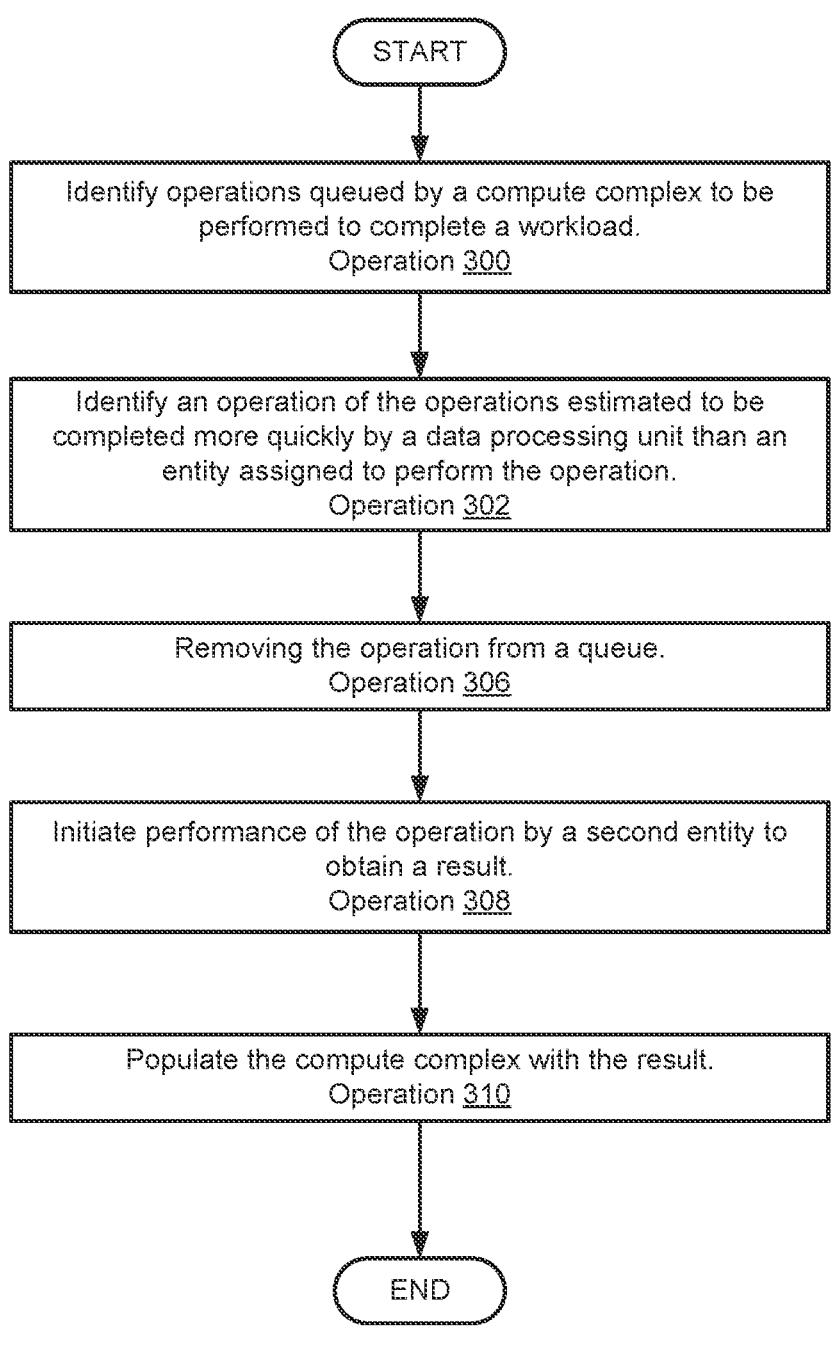
FIGS. 3A-3B show flow diagrams illustrating methods in accordance with an embodiment.
Figure 3B:
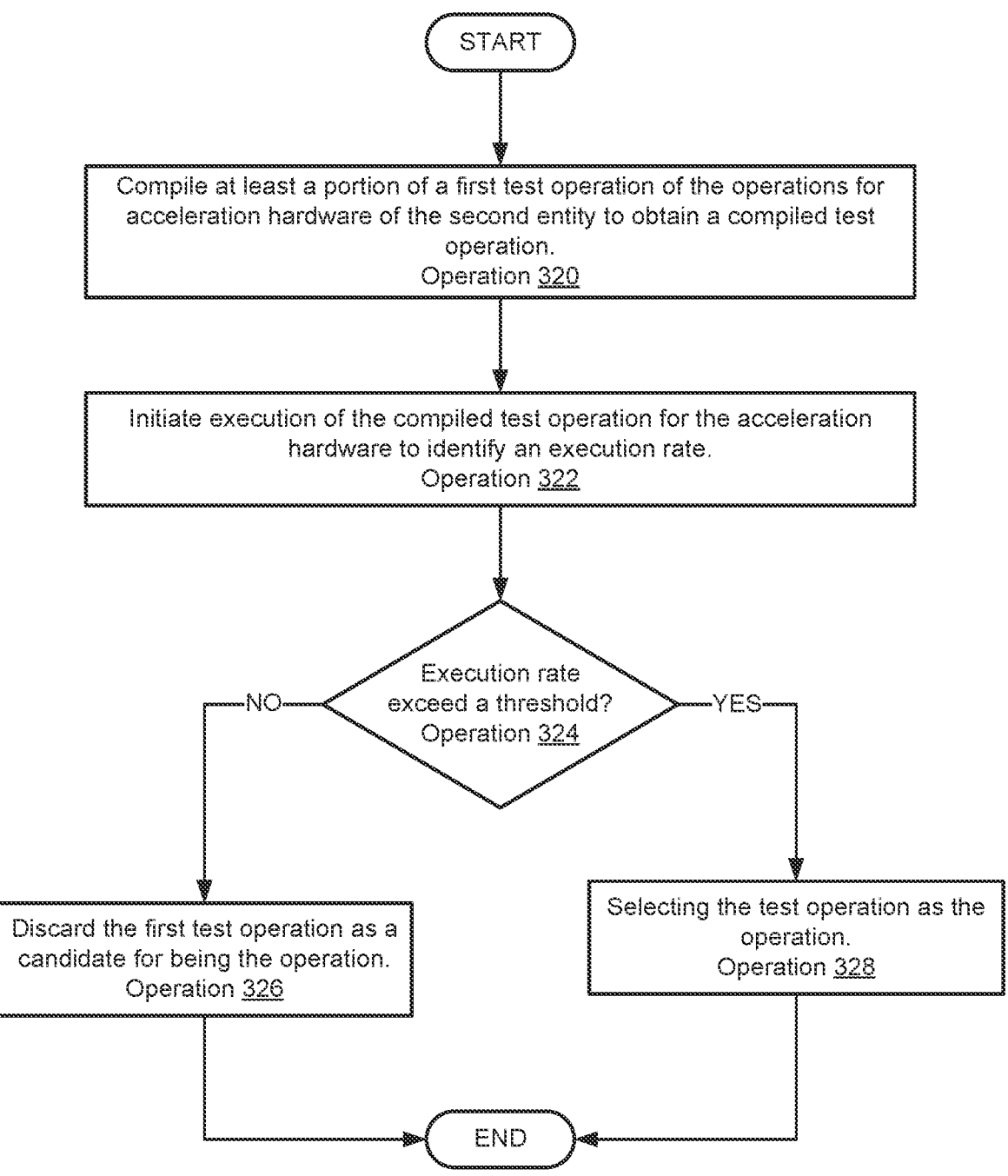

As discussed above, the components of FIG. 1 may perform various methods to perform workloads. FIGS. 3A-3B illustrate examples of methods that may be performed by the components of FIG. 1 when providing their functionalities. In the diagrams discussed below and shown in FIGS. 3A-3B, any of the operations may be repeated, performed in different orders, and/or performed in a parallel and/or a partially overlapping in time manner with other operations.

Turning to FIG. 3A, a flow diagram illustrating a method of performing workloads in accordance with an embodiment is shown. The method may be performed by a SNIC, a data processing system, a compute complex, a support complex, and/or other components of FIG. 1.

At operation 300, operations queued by a compute complex to be performed to complete a workload are identified. The operations may be identified by (i) actively reading the operations from memory of the compute complex, (ii) by reading the operations from communications between the compute complex and other devices, and/or via other methods.

At operation 302, an operation of the operations estimated to be completed more quickly by a data processing unit than an entity assigned to perform the operation is identified. The operation may be identified by (i) testing any of the operations to estimate the rate at which the operations are likely to be performed, (ii) comparing the estimate rates to thresholds or other metrics to discriminate one or more of the operations, and (iii) using one of the discriminated operations as the operation. The operation may be identified via the method illustrated in FIG. 3B without departing from embodiments disclosed herein.

At operation 306, the operation is removed from a queue. The operation may be removed from the queue by (i) reading the operation in memory from the compute complex, (ii) intercepting the operation from a message that was sent from the compute complex and is expected to be received and stored in a queue managed by another device, and/or via other methods.

The queue of the compute complex may be operably connected to a SNIC via a bus or other channel. For example, the SNIC may read the memory in which the elements of the queue are stored using bare metal communications.

The SNIC may be positioned between the compute complex and the other device. Consequently, communications which may include the operations may pass through the SNIC. While doing so, the SNIC may inspect the content of the communications to identify the operations. If an operation is identified, the SNIC may not forward the identified operations to the devices to which the communications are directed. As discussed above, the SNIC may present various resources of other devices as bare metal resources reachable by the compute complex. Consequently, from the perspective of the compute complex, the SNIC may not appear as a separate device thereby being transparent to the compute complex.

At operation 308, performance of the operation by a second entity is initiated to obtain a result. The performance of the operation may be initiated by (i) using local acceleration hardware to perform the operation, and/or (ii) using remote acceleration hardware (e.g., resources of another device) to perform the operation. Performing the operation may generate a result which may be expected by the compute complex to exist at a particular location in memory once the operation has been performed. For example, the queue of operation and the locations where the results are expected to be positioned may be in system memory which processors of the compute complex may use to stage operations for future performance, and offload results that have been generated by performing operations.

Schedulers of the processors may then typically populate processing pipelines of the processors with the operations from the queue (or further compiled to operations compatible with the processing pipelines of the processors). Once populated, results may be generated and stored in system memory as output from the operations.

The location or remote acceleration hardware may also compile the operations to compatible operations for the architecture of the acceleration hardware.

At operation 310, the compute complex is populated with the result. The compute complex may be populated with the result by storing a copy of the result in memory of the compute complex.

If the operation was obtained by reading the operation from the queue in the compute complex, the result may be stored in memory directly via bare metal communications.

If the operation was obtained from communications between the compute complex and another device, the result may either be provided to the compute complex via a communication directed to a sending entity (e.g., a driver hosted by the compute complex), or may be added to a communication from the device and that is directed to the compute complex. In this manner, multiple processing results from different hardware may be integrated and returned to the compute complex as single unified result. If provided via communication rather than directed writes, the processors that process the communications may stored the results in corresponding memory locations.

The method may end following operation 310.

In some cases, operations which may be performed via acceleration hardware may not in fact be completed more quickly than local execution via a processor of a compute complex. To reduce the likelihood of delaying completion of workloads, the operations may be analyzed ahead of removal from queues or communications.

Turning to FIG. 3B, a flow diagram illustrating a method of identifying operations that are likely to be more quickly performed via offloading in accordance with an embodiment is shown. The method may be performed by a SNIC, a data processing system, a compute complex, a support complex, and/or other components of FIG. 1.

At operation 320, at least a portion of a first test operation of operations under consideration for acceleration may be compiled for acceleration hardware of a second entity to obtain a compiled test operation. The second acceleration hardware may be local acceleration hardware of a SNIC or remote acceleration hardware of another device. The SNIC may have already identified the operations, as described with respect to FIG. 3A. The first test operation may be any of the operations that have been identified. The first test operation may be compiled using any compilation method that is compatible with the acceleration hardware. Only a portion of the operation may be compiled to reduce a duration of the time when compared to compiling the entire operation. The operation may be, for example, an algorithm to be performed, cryptographic operations, and/or other types of operations that may be completed more quickly using acceleration hardware rather than general purpose computation hardware of processors.

At operation 322, execution of the compiled test operation for the acceleration hardware is initiated to identify an execution rate. The execution rate may be identified by timing the duration of time required to complete the execution of the compiled test operation.

At operation 324, a determination is made regarding whether the execution rate met a threshold. The threshold may be based on the type of the operation (e.g., different durations of time for completion of operations may be established by a subject matter expert, may be established historically by analysis of corresponding operations performed by processors, and/or via other methods). The threshold may define, for example, a minimum rate of execution for the portion of the operation, a maximum duration of time for completion of the execution, and/or other criteria for ascertaining whether the execution rate is sufficient such that the acceleration hardware will likely complete performance of the operation more quickly than a processor of a compute complex or another device which may otherwise perform the operation.

If the execution rate exceeds the threshold, then the method may proceed to operation 328. Otherwise, the method may proceed to operation 326.

At operation 326, the first test operation is discarded as a candidate for being the operation. In other words, it may be determined that the acceleration hardware would likely not improve the rate at which the workload is performed. Consequently, other operations may be considered for acceleration rather than the first test operation.

The method may end following operation 326. If the method end, the method may be performed again but for other test operations of the operations.

Returning to operation 324, the method may proceed to operation 328 following operation 324 if the execution rate exceeds a threshold.

At operation 328, the test operation is selected as the operation.

The method may end following operation 328.

Using the methods illustrated in FIGS. 3A-3B, embodiments disclosed herein may facilitate performance of workloads in a manner that more efficiently utilized limited computing resources. By automatically moving operations to performance by acceleration hardware of other devices, the rate at which workloads are performed may be increased without adding additional overhead to compute complexes.

Figure 4:
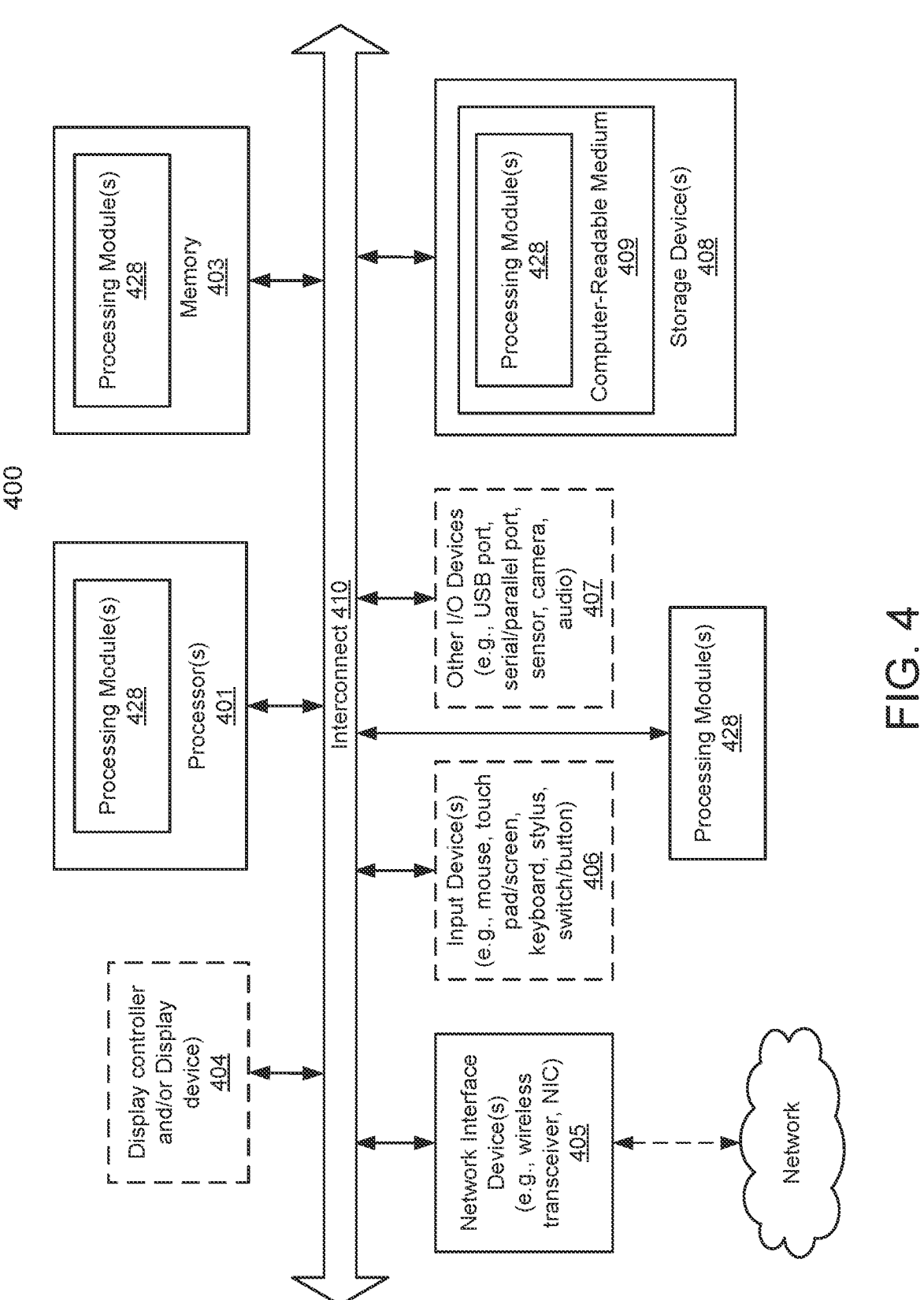
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (SNIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The SNIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing performance of workloads across a heterogenous processing system, the method comprising:

identifying operations queued by a compute complex to be performed to complete a workload;

identifying an operation of the operations estimated to be completed more quickly by a data processing unit than an entity assigned to perform the operation, wherein identifying the operation comprises:

compiling at least a portion of a first test operation of the operations for acceleration hardware of a second entity to obtain a compiled test operation;

initiating execution of the compiled test operation for the acceleration hardware to identify an execution rate;

making a determination regarding whether the execution rate exceeds a threshold;

in a first instance of the determination where the execution rate exceeds the threshold: selecting the first test operation as the operation; and in a second instance of the determination where the execution rate does not exceed the threshold: discarding the first test operation as a candidate for being the operation;

prior to initiation of performance of the operation by the entity:

removing the operation from a queue;

initiating performance of the operation by the second entity to obtain a result; and populating the compute complex with the result.

2. The method of claim 1, wherein the data processing unit comprises the acceleration hardware.

3. The method of claim 2, wherein the data processing unit presents itself to the compute complex as a bare metal resource.

4. The method of claim 3, wherein the compute complex hosts the queue, and the second entity is the data processing unit.

5. The method of claim 4, wherein populating the compute complex with the result comprises storing the result in a memory location where the compute complex would store a result of performing the operation by the compute complex or another device.

6. The method of claim 5, wherein the other device is a graphics processing unit, and the queue is part of memory of the device populated by the compute complex using remote direct memory access.

7. The method of claim 1, wherein the operations are queued in a queue maintained by the compute complex.

8. The method of claim 1, wherein the data processing unit is associated with the second entity.

9. A non-transitory machine-readable medium having instructions stored therein, which when executed by a processor, cause the processor to perform computing operations for managing performance of workloads across a heterogenous processing system, the computing operations comprising:

identifying operations queued by a compute complex to be performed to complete a workload;

identifying an operation of the operations estimated to be completed more quickly by a data processing unit than an entity assigned to perform the operation, wherein identifying the operation comprises:

compiling at least a portion of a first test operation of the operations for acceleration hardware of a second entity to obtain a compiled test operation;

initiating execution of the compiled test operation for the acceleration hardware to identify an execution rate;

making a determination regarding whether the execution rate exceeds a threshold;

in a first instance of the determination where the execution rate exceeds the threshold: selecting the first test operation as the operation; and in a second instance of the determination where the execution rate does not exceed the threshold: discarding the first test operation as a candidate for being the operation;

prior to initiation of performance of the operation by the entity:

removing the operation from a queue;

initiating performance of the operation by the second entity to obtain a result; and populating the compute complex with the result.

10. The non-transitory machine-readable medium of claim 9, wherein the data processing unit comprises the acceleration hardware.

11. The non-transitory machine-readable medium of claim 10, wherein the data processing unit presents itself to the compute complex as a bare metal resource.

12. The non-transitory machine-readable medium of claim 11, wherein the compute complex hosts the queue, and the second entity is the data processing unit.

13. The non-transitory machine-readable medium of claim 12, wherein populating the compute complex with the result comprises storing the result in a memory location where the compute complex would store a result of performing the operation by the compute complex or another device.

14. The non-transitory machine-readable medium of claim 13, wherein the other device is a graphics processing unit, and the queue is part of memory of the device populated by the compute complex using remote direct memory access.

15. A data processing system, comprising:

a processor, and a memory coupled to the processor to store instructions, which when executed by the processor, cause the data processing system to perform computing operations for managing performance of workloads across a heterogenous processing system, the computing operations comprising:

identifying operations queued by a compute complex to be performed to complete a workload;

identifying an operation of the operations estimated to be completed more quickly by a data processing unit than an entity assigned to perform the operation, wherein identifying the operation comprises:

compiling at least a portion of a first test operation of the operations for acceleration hardware of a second entity to obtain a compiled test operation;

initiating execution of the compiled test operation for the acceleration hardware to identify an execution rate;

making a determination regarding whether the execution rate exceeds a threshold;

in a first instance of the determination where the execution rate exceeds the threshold: selecting the first test operation as the operation; and in a second instance of the determination where the execution rate does not exceed the threshold: discarding the first test operation as a candidate for being the operation;

prior to initiation of performance of the operation by the entity:

removing the operation from a queue;

initiating performance of the operation by a second entity to obtain a result; and populating the compute complex with the result.

16. The data processing system of claim 15, wherein the data processing unit comprises the acceleration hardware.

17. The data processing system of claim 16, wherein the data processing unit presents itself to the compute complex as a bare metal resource.

18. The data processing system of claim 17, wherein the compute complex hosts the queue, and the second entity is the data processing unit.

19. The data processing system of claim 18, wherein populating the compute complex with the result comprises storing the result in a memory location where the compute complex would store a result of performing the operation by the compute complex or another device.

20. The data processing system of claim 19, wherein the other device is a graphics processing unit, and the queue is part of memory of the device populated by the compute complex using remote direct memory access.

* * * * *